United States Patent [19]
Goetz et al.

[11] Patent Number: 5,327,143
[45] Date of Patent: Jul. 5, 1994

[54] MULTIPLE ARM SPIRAL ANTENNA SYSTEM WITH MULTIPLE BEAMFORMING CAPABILITY

[75] Inventors: Allan C. Goetz, La Jolla; Timothy L. Boolos, Escondido, both of Calif.

[73] Assignee: TRW Inc., Redondo Beach, Calif.

[21] Appl. No.: 902,334

[22] Filed: Jun. 22, 1992

[51] Int. Cl.[5] .......................... G01S 3/16; G01S 3/28
[52] U.S. Cl. .................................... 342/382; 342/158
[58] Field of Search ............... 342/382, 384, 447, 154, 342/157, 158

[56] References Cited

U.S. PATENT DOCUMENTS

| | | |
|---|---|---|
| 3,903,522 | 9/1975 | Copeland. |
| 4,160,975 | 7/1979 | Steudel. |
| 4,885,590 | 12/1989 | Hasan ..................................... 342/384 |
| 5,172,125 | 12/1992 | Peregrim et al. ..................... 342/154 |

Primary Examiner—Theodore M. Blum
Attorney, Agent, or Firm—Ronald L. Taylor

[57] ABSTRACT

A multifunction antenna system is provided which has adaptive beam forming capabilities for transmitting and receiving signals having various beam patterns over a hemispherical field of view. The antenna system includes a beamformer having an array of N spiral arm elements for transmitting and receiving a radiating beam. N analytic voltage signals are produced by the N cylindrically symmetric spiral arm elements in relation to the radiating beam. A beam processor is further provided for selecting the appropriate combination of vector weight coefficients in response to input data. The beam processor loads the selected N vector weights into a vector weighter. In the transmit mode, the vector weighter multiplies the selected vector weights by an input signal to produce the N analytic signals which are then applied to the multiple arm spiral antenna and transmitted therefrom. In the receive mode, the vector weighter multiplies the N analytic signals received by the selected N vector weights to obtain information from the desired direction. The antenna system is further capable of processing the signals received and providing adaptive beam patterns in response thereto.

16 Claims, 6 Drawing Sheets

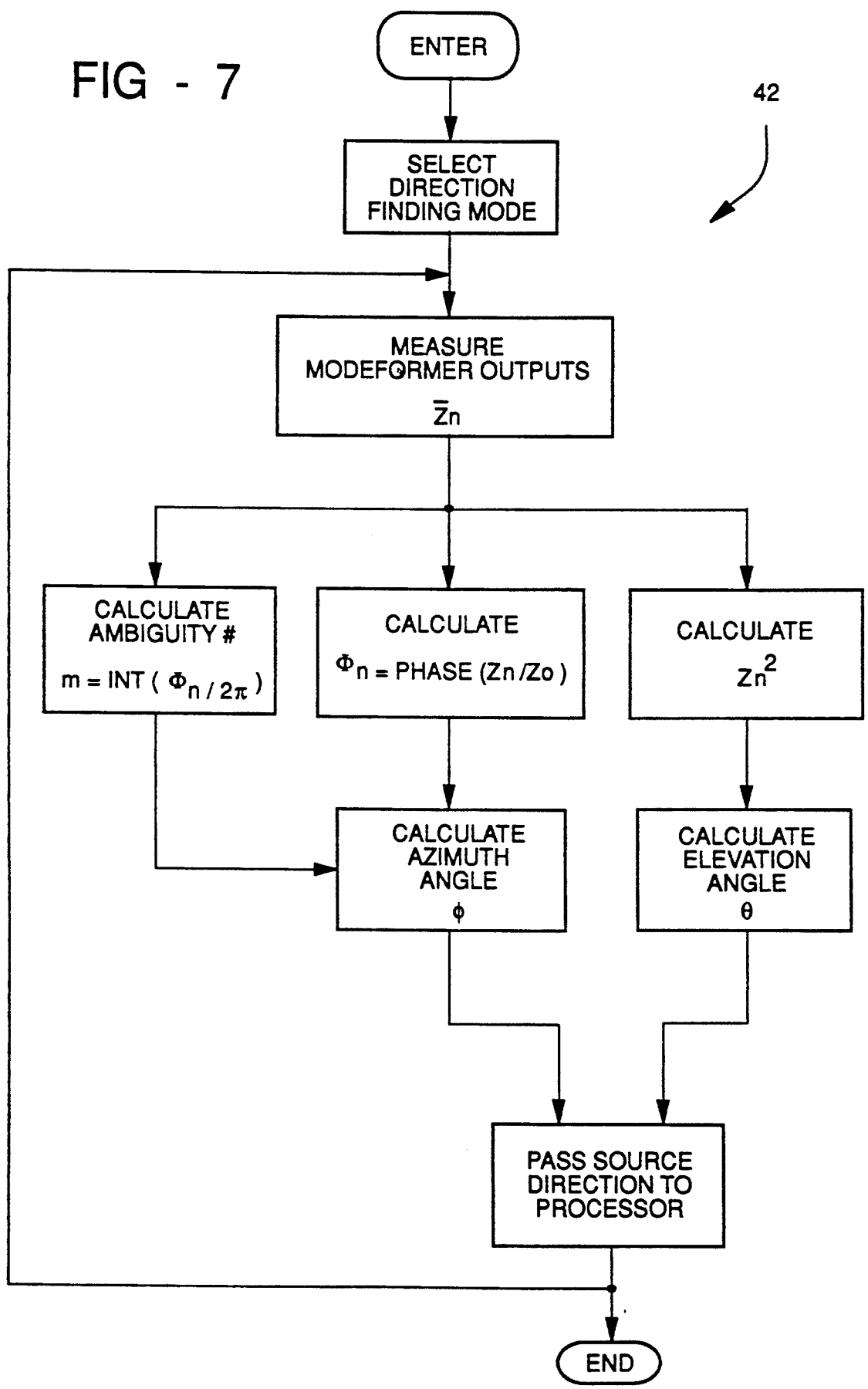

MULTIPLE ARM SPIRAL ANTENNA SYSTEM WITH MULTIPLE BEAMFORMING CAPABILITY

BACKGROUND OF THE INVENTION

1. Technical Field

This invention relates generally to antenna systems and, more particularly, to a multifunction antenna system and method for providing controllable and adaptive antenna beam patterns with a multiple arm spiral antenna.

2. Discussion

Modern avionics systems and the like generally require multifunction antennas in order to meet operating requirements which are typically imposed. Such requirements include the transmission and reception of long range signals with optimal beam patterns over a wide field of view. Another requirement is the ability to provide a plurality of operating modes with a single antenna aperture that may be used to support multiple avionics functions. In addition, wide frequency bandwidth requirements have generally been imposed which allow for a larger number of multifunction operations. Requirements such as these have generally been imposed on electronic warfare (EW) and communications, navigation and identification (CNI) waveforms and operating modes for modern antenna systems.

To increase the communication link range of long range operating modes, a high gain antenna pattern is generally required in order to provide increased gain in a particular direction. Similarly, if an undesirable interfering source is detected in a particular direction, generally an antenna null should be produced in that direction in order to reduce the strength of the jamming signal received. Conventional antenna systems have been developed which provide for a predetermined beam pattern, however, such antenna systems generally have not provided for multifunction and adaptive beamforming capabilities.

In particular, multiple arm spiral antennas (MASA) have been developed for providing enhanced wide field of view antenna operations. The conventional MASA generally includes multiple cylindrically symmetric spiral arm elements which transmit and receive radiating signals in a predetermined beam pattern. The conventional MASA is generally limited to the single predetermined beam pattern and is therefore limited to applications which operate with a single beam pattern. As a result, the conventional MASA generally does not allow for multifunction operations. In addition, the conventional MASA generally does not provide for enhanced multiple operating modes with controllable beam patterns or adaptive beam forming capabilities.

It is therefore desirable to provide for an enhanced multifunction antenna system for transmitting and receiving signals in a controllable beam pattern. It is further desirable to provide for such an antenna system which may select amongst a plurality of beam patterns to provide multiple operating functions. In particular, it is desirable to provide for an antenna system which may transmit and receive a steered beam with increased gain in a particular direction and/or produce a steered null in a desired direction. In addition, it is also desirable to provide for such an antenna system which produces a beam pattern with multiple simultaneous beams and nulls. Furthermore, it is further desirable to provide for such an antenna system which has adaptive beamforming capabilities.

SUMMARY OF THE INVENTION

In accordance with the teachings of the present invention, a multifunction antenna system and method are provided for transmitting and receiving signals in desired beam patterns. The antenna system includes a beam former having an array of N cylindrically symmetric spiral elements for transmitting and receiving signals. A plurality of combinations of N vector weight coefficients are stored in memory which represent predetermined beam patterns. N analytic voltage signals are associated with the N spiral elements. A beam processor is further provided for selecting the appropriate combination of vector weight coefficients in response to input data. The beam processor loads the selected N vector weights into a vector weighter. In the transmit mode, the vector weighter multiplies the selected vector weights by an input signal to produce the N analytic signals which are then applied to the multiple arm spiral antenna and transmitted therefrom. In the receive mode, the vector weighter multiplies the N analytic signals received by the selected N vector weights to obtain information from the desired direction. The antenna system is further capable of processing the signals received and providing adaptive beam patterns in response thereto.

BRIEF DESCRIPTION OF THE DRAWINGS

Other objects and advantages of the present invention will become apparent to those skilled in the art upon reading the following detailed description and upon reference to the drawings in which:

FIG. 7 is a flow diagram which illustrates the processing of an angle of arrival algorithm in accordance with the present invention.

DETAILED DESCRIPTION OF THE PREFERRED EMBODIMENT

Figure 1:
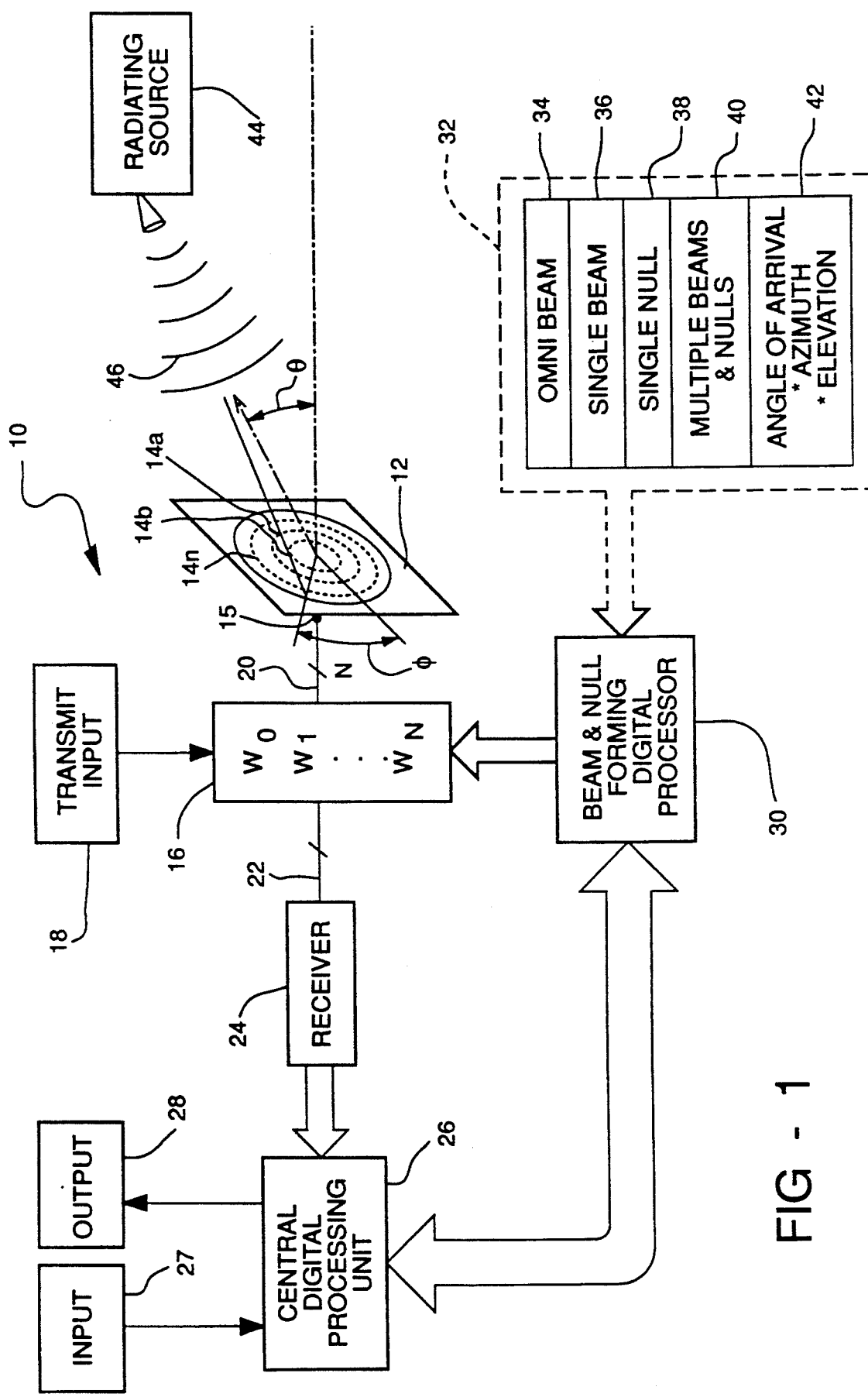
FIG. 1 is a block diagram which illustrates the multifunction antenna system in accordance with the present invention.
Figure 2:
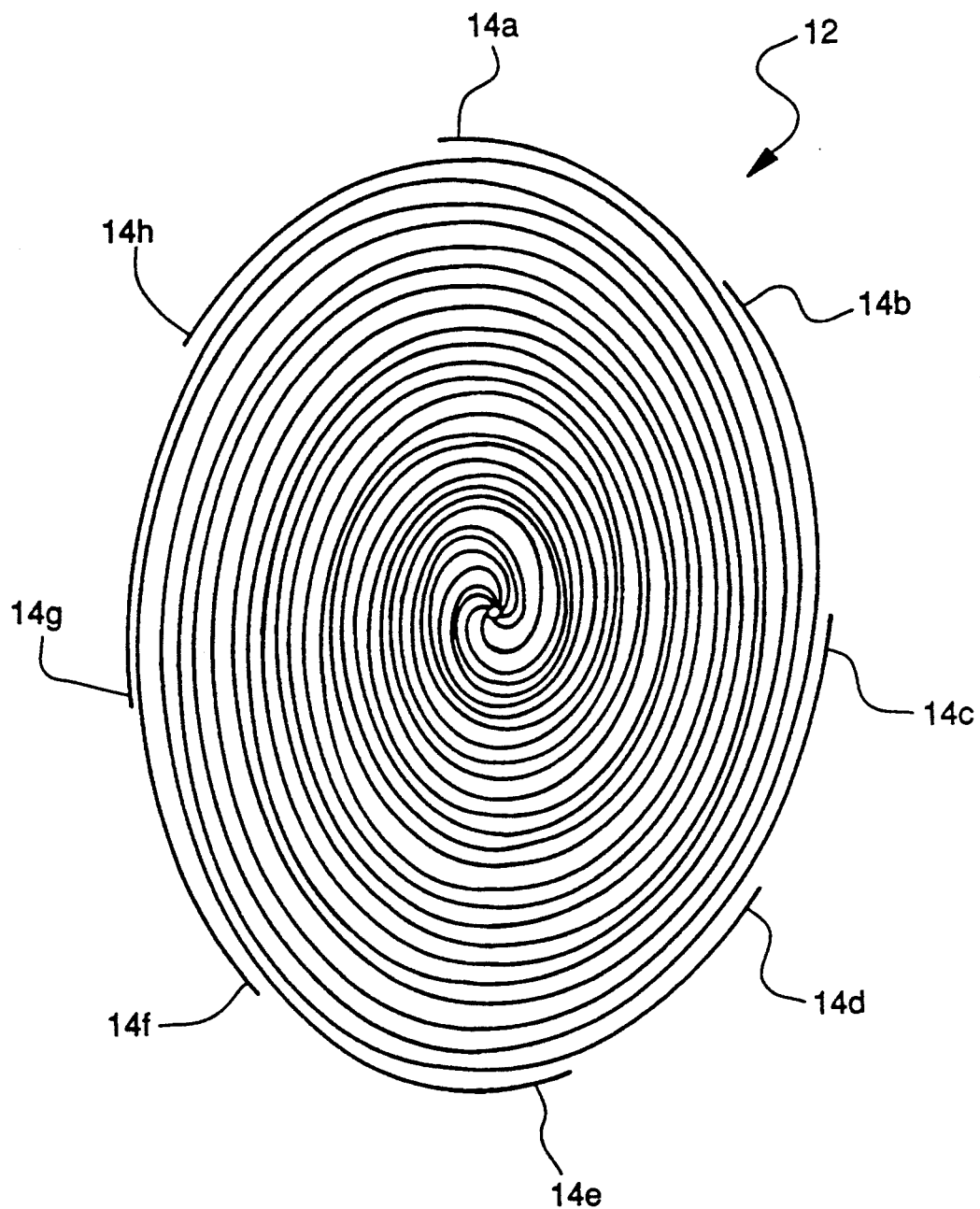
FIG. 2 is a schematic representation of a multiple arm spiral antenna which may be used in accordance with the present invention.

Turning now to FIG. 1, a multifunction antenna system 10 is shown therein in accordance with the present invention. The antenna system 10 includes a multiple arm spiral antenna 12 for transmitting and receiving radiating signals 46. The multiple arm spiral antenna 12 is a single aperture beam former which has an array of N cylindrically symmetric spiral arm elements 14A through 14N. A multiple arm spiral antenna 12 is shown in FIG. 2 which has eight conductive cylindrically symmetric spiral arm elements 14A through 14H. The conductive spiral arm elements 14A through 14N may be fabricated by photolithographic techniques known in the art. While the antenna 12 in FIG. 2 shows eight spiral arm elements 14A through 14H, any number of spiral arm elements may be employed for purposes of this invention.

Upon receiving energy from the radiating source 46, each of the N spiral elements 14A through 14N are energized with one of N analytic voltage signals 20. The multiple arm spiral antenna 12 may operate to transmit a radiating signal in response to the N analytic voltage signals 20 applied to the N spiral arm elements 14A through 14N. Likewise, the multiple arm spiral antenna 12 may operate to receive a radiating signal and produce in response thereto, N analytic voltage signals 20 on the N spiral elements 14A through 14N.

The multiple arm spiral antenna 12 is coupled to a vector weighter 16 via an antenna port 15 so that the N analytic voltage signals 20 communicate therebetween. The vector weighter 16 is an analog hardware device made up of a plurality of PIN switches and RF circuitry. The vector weighter 16 has phase shifting and attenuation capabilities which provide for analog signal weighting. The vector weighter 16 is loaded with a combination of N vector weight coefficients $W_o$ through $W_n$. The N vector weight coefficients $W_0$ through $W_n$ are essentially spherical harmonic coefficients which represent a predetermined beam pattern. The vector weighter 16 provides analog signal weighting or multiplies N analog input signals input thereto by the N vector weight coefficients $W_o$ through $W_n$ to produce N weighted signals which form transmit and receive beams. Different sets of vector weight coefficients $W_o$ through $W_n$ may be employed to produce a plurality of beams which are constructed from different spherical harmonic functions.

The vector weighter 16 has an output coupled to a receiver 24. The receiver 24 receives the N weighted analog signals and provides a digital signal as an output. The digital signal produced by the receiver 24 contains signal information received from the selected beam pattern. Such signal information may include communication, navigation, or identification signals or remote source direction information.

The receiver 24 has an output coupled to a central digital processing unit 26. The central digital processing unit 26 may communicate with an input device 27 and an output device 28. The input and output devices 27 and 28 allow for an operator and/or external hardware to interface therewith. The central digital processing unit 26 processes the digital signals received from the receiver 24. In doing so, the central digital processing unit 26 may determine the direction of a given signal or may obtain information from a selected direction and determine whether or not the signal received is desirable or not. For desirable signals, the antenna system 10 may adapt to focus in on or provide increased gain in that direction. For undesirable signals such as a jamming signal, the antenna system 10 may produce a null in the direction of the undesirable signal.

A beam and null forming digital processor 30 is provided for processing system data and selecting the proper combination of N vector weight coefficients $W_o$ through $W_n$. The digital processor 30 communicates with the central digital processing unit 26 to receive processed information therefrom. As a result, the digital processor 30 may determine which combination of vector weight coefficients $W_o$ through $W_n$ are to be selected by processing any operator inputs and prior data received by the antenna system 10.

The digital processor 30 further communicates with a global memory 32 or other external memory supply. The global memory 32 is programmed with a plurality of beam forming and angle of arrival algorithms. The beam forming algorithms may include an omni beam algorithm 34 for providing preset omni beam patterns. A single steered beam forming algorithm 36 may be employed for steering an antenna beam in a desired direction. In addition, a single null forming algorithm 38 may be employed for adaptively providing a null or a decreased gain in a particular direction. A multiple beam and null forming algorithm 40 may be employed for producing a beam having multiple combinations of increased gains and nulls. Furthermore, an angle of arrival algorithm 42 may be employed for processing information received from a desired direction.

Each of the beam forming and angle of arrival algorithms are represented by a plurality of predetermined combinations of N vector weight coefficients $W_o$ through $W_n$. These combinations of vector weight coefficients $W_o$ through $W_n$ are preferably generated as a result of prior testing and as such provide predetermined vector information for the particular multiple arm spiral antenna 12 employed. In addition, the global memory 32 may further include additional predetermined data such as known positions of any desirable or undesirable signal sources. Such information may enable the digital processor 30 to select vector weight coefficients $W_o$ through $W_n$ which conform with such information.

The beam and null forming digital processor 30 selects the proper set of vector weight coefficients $W_o$ through $W_n$ from the global memory 32 and loads the selected set of vector weight coefficients $W_o$ through $W_n$ as an output into the vector weighter 16. The vector weighter 16 then multiplies the vector weight coefficients $W_o$ through $W_n$ by vector weighter input signals to produce N weighted signals which have spherical harmonic coefficients. While transmitting, vector weighter input signals may include a transmit input signal 18 such as a communication signal. While receiving, the vector weighter input signals include the N analytic voltage signals 20.

The selected vector weight coefficients $W_o$ through $W_n$ essentially decompose the vector weighter input signals into cylindrically symmetric modes representative of predetermined beam patterns. Specific antenna characteristics for the multiple arm spiral antenna 12 are thereby contained in the spherical harmonic coefficients. As a result, an N arm spiral antenna 12 pattern may be characterized by $N^2$ spherical harmonic functions. As a result, by selecting the appropriate vector weights $W_o$ through $W_n$ which represent the predetermined operating modes, the beam pattern can be shaped in any of a plurality of predetermined beam patterns.

In an alternate embodiment, the multifunction antenna system 10 may further provide for real time processing of the beam forming and angle of arrival algorithms. As such, a high speed real time processor may be employed as the beam and null forming digital processor 30. The high speed digital processor 30 may thereby process the selected algorithm to generate the proper vector weight coefficients $W_o$ through $W_n$ as needed.

In the transmit mode, the multifunction antenna system 10 operates to transmit a radiating signal in accordance with a selected beam pattern. In doing so, the beam and null forming processor 30 communicates with the global memory 32 to select or generate a set of predetermined vector weight coefficients $W_o$ through $W_n$ provided by the plurality of beam-forming algorithms. The digital processor 30 then loads the vector weight coefficients $W_o$ through $W_n$ into the vector weighter 16. The vector weighter 16 further receives a transmit input signal 18 which may include any desired transmission data. As such, the vector weighter 16 multiplies the vector weight coefficients $W_o$ through $W_n$ by the transmit input signal 18 to form N analytic voltage signals 20. The N analytic voltage signals 20 are transmitted to the associated N cylindrical arm elements 14A through 14N of the multiple arm spiral antenna 12 via antenna port 15. The multiple arm spiral antenna 12 then transmits a radiating signal in a selected beam pattern in response to the N analytic voltage signals via the spiral arm elements 14A through 14N.

In the receive mode, the multifunction antenna system 10 generally operates to receive radiating signals over a wide field of view and to process information from a desired direction or beam pattern. In doing so, the multiple arm spiral antenna 12 receives a radiating signal 46 from a radiating source 44 or any number of sources. As such, each of the spiral arm elements 14A through 14N of the multiple arm spiral antenna 12 are energized with an analytic voltage signal in response to the received radiating signal 46. The energized spiral arm elements 14A through 14N together provide for the N analytic voltage signals 20 which are transmitted to the vector weighter 16. The output of the vector weighter 16 is received by the receiver 24 and thereafter supplied to the central digital processing unit 26. The central digital processing unit 26 processes the digital data and provides control information as an output to the beam and null forming digital processor 30.

The digital processor 30 processes the control information and determines which set of vector weight coefficients $W_o$ through $W_n$ should be selected. This determination may depend on any operator control signal or prior received data. For instance, an operator may select the beam pattern. In addition, the selected beam pattern may be effected by prior received data and may adapt to changing conditions. The digital processor 30 selects or generates the set of N vector weight coefficients $W_o$ through $W_n$ and loads the selected set of vector weight coefficients $W_o$ through $W_n$ into the vector weighter 16. The vector weighter 16 thereby multiplies the selected set of vector weight coefficients $W_o$ through $W_n$ by the N analytic arm signals 20 so as to produce N weighted output signals 22. The N weighted output signals 22 contain the data received from the selected beam pattern in accordance with the selected vector weight coefficients $W_o$ through $W_n$. As a result, radiating signals which are received from non-selected directions not within the beam pattern are not processed and are thereby spatially filtered.

While in the receive mode, the antenna system 10 may further employ an angle of arrival algorithm 42 which may determine the direction of an emitting source such as radiating source 44. This feature is based on unique properties for phase and amplitude of the multiple arm spiral antenna 12. The phase of the N analytic signals 20 are generally linearly related to the azimuth position of the source. In addition, the amplitude of the N analytic signals 20 are generally related to the elevation position of the source. In the direction finding mode, the vector weighter 16 is set to sequentially (in time) provide the vector weight coefficients $W_o$ through $W_n$ for certain signals received. The phase of these modes are used to determine the azimuth angle $\phi$ of the source while the square of amplitudes are used to determine the elevation angle $\theta$ of the source with respect to the antenna coordinates. Together the azimuth and elevation angles $\phi$ and $\theta$ provide the vector direction of the source which is passed to the central processing unit 26. If only the azimuth direction of the source is needed, the elevation angle calculation is generally not performed.

Figure 3:
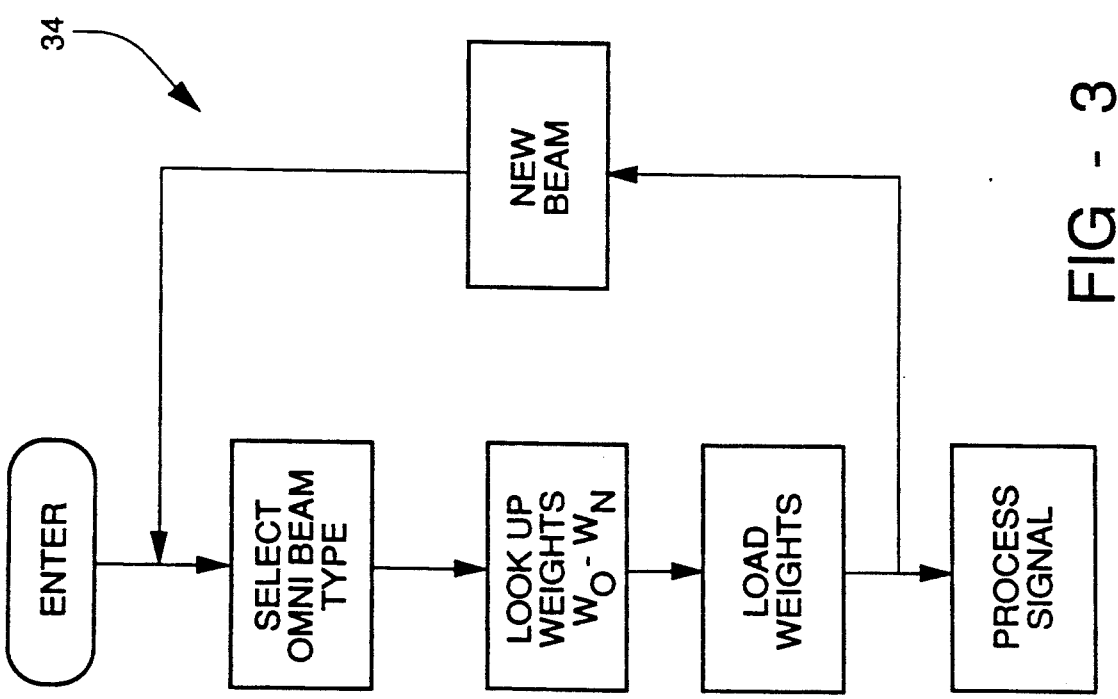
FIG. 3 is a flow diagram which illustrates the processing of an omni beam algorithm in accordance with the present invention.

The beam forming and angle of arrival algorithms are illustrated in the flow diagrams shown in FIGS. 3 through 7. FIG. 3 illustrates an omni beam algorithm 34 which may be employed in conjunction with the present invention. The omni beam algorithm 34 operates such that the desired type of omni beam is first selected. The proper set of vector weights $W_o$ through $W_n$ are then selected and loaded into the digital processor 30 which loads the vector weight coefficients into the vector weighter 16. The antenna system 10 then proceeds to transmit or receive signals in accordance with the omni beam algorithm 34.

Figure 4:
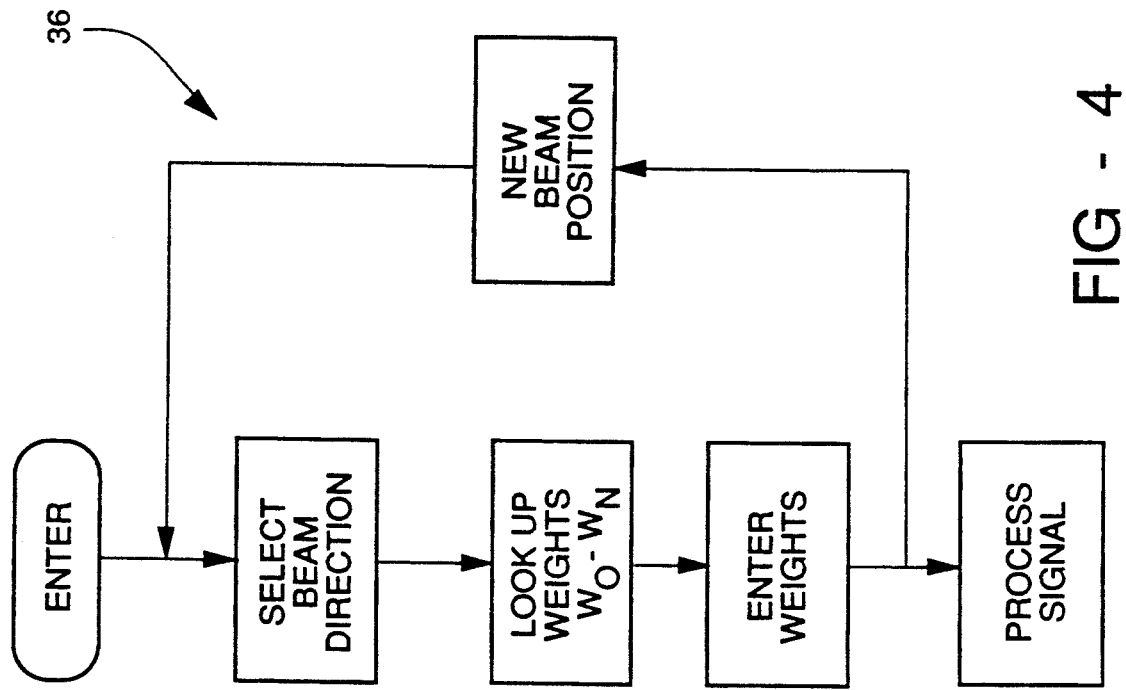
FIG. 4 is a flow diagram which illustrates the processing of a single beam pointing algorithm in accordance with the present invention.
Figure 5:
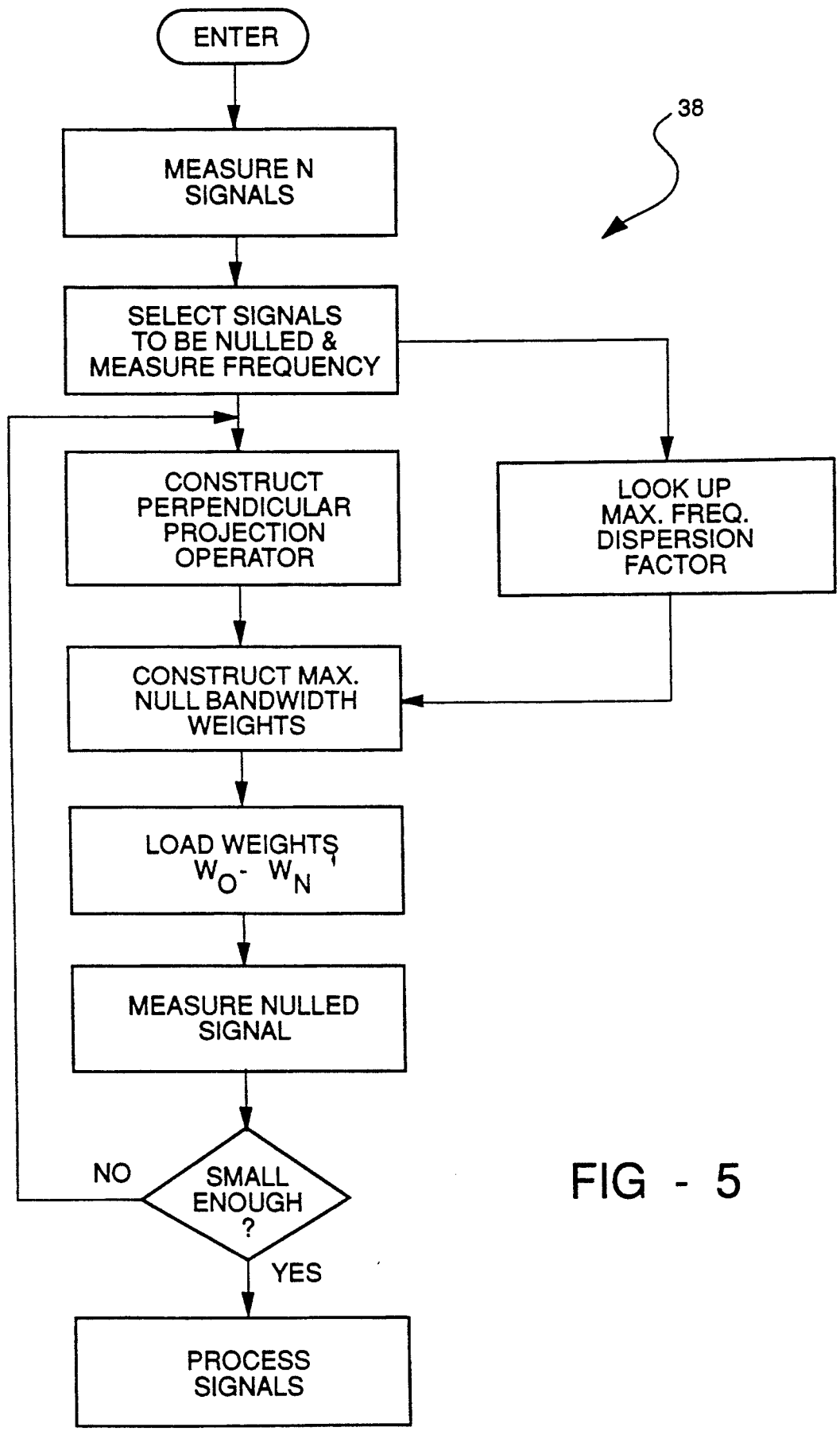
FIG. 5 is a flow diagram which illustrates the processing of a single null forming algorithm in accordance with the present invention.
Figure 6:
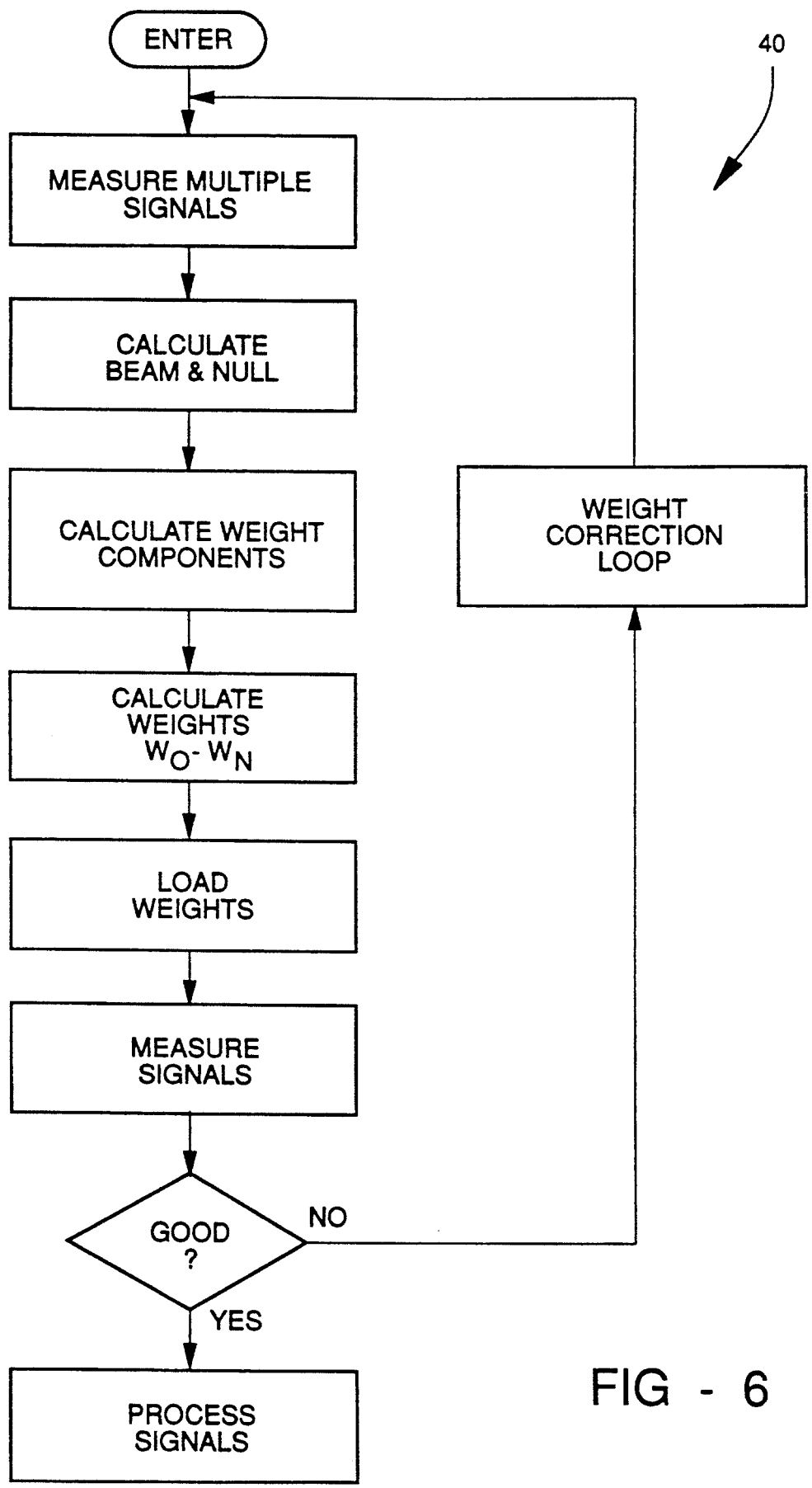
FIG. 6 is a flow diagram which illustrates the processing of a multiple beam and null forming algorithm in accordance with the present invention.

FIG. 4 illustrates the flow diagram for a single beam pointing algorithm 36. The single beam pointing algorithm 36 is likewise selected by choosing the appropriate set of vector weight coefficients $W_o$ through $W_n$ The antenna system 10 then processes a transmit or receive signal to provide increased gain in the desired beam direction. FIG. 5 illustrates a null forming algorithm 38. The null forming algorithm 38 essentially produces a decreased amplitude in a particular direction with the maximum null bandwidth. That is, the null depth is generally maintained over the widest possible frequency range. FIG. 6 illustrates the flow diagram for a multiple beam and null forming algorithm 40. As such, the multiple beam and null forming algorithm 40 provides a plurality of beams with increased gains and nulls in particular directions to provide a desired beam pattern. As such, a complex multifunction antenna system may be provided for transmitting beams in a steered direction or a plurality of directions while decreasing the gain in other directions. An angle of arrival algorithm is shown in FIG. 7. The angle of arrival algorithm 42 operates to detect the direction of signals received.

The present invention is described herein in connection with the preferred analog and digital hardware; however, it should be appreciated that other similar hardware devices may be employed without departing from the invention. For instance, the analog vector weighter 16 may be implemented with digital processing techniques. Likewise, the digital processing unit 26 and digital processor 30 may be implemented with analog circuitry.

In view of the foregoing, it can be appreciated that the present invention enables the user to achieve a multifunction antenna system which provides adaptive beam forming capabilities. Thus, while this invention has been disclosed herein in connection with a particular example thereof, no limitation is intended thereby except as defined by the following claims. This is because the skilled practitioner will recognize that other modifications can be made without departing from the spirit of this invention after studying the specification and drawings.

We claim:

1. A multifunction antenna system comprising:

antenna beamforming means having an array of N elements for transmitting and receiving radiating signals, said beamforming means further having N analytic signals associated with said N elements;

processing means for selecting a set of N vector weight coefficients which are representative of a predetermined beam pattern; and multiplier means for multiplying said N vector weight coefficients by an input transmit signal to produce said N analytic voltage signals when transmitting signals within a selected beam pattern, said multiplier means applying said N vector weight coefficients by said N analytic signals to provide N weighted receive signals which enable processing of data received from a selected beam pattern when receiving signals.

2. The antenna system as defined in claim 1 further comprising:

memory means for storing a plurality of sets of vector weight coefficients which represent different predetermined beam patterns.

3. The antenna system as defined in claim 1 wherein said antenna beamforming means comprises a multiple arm spiral antenna having N symmetric spiral elements.

4. The antenna system as defined in claim 2 wherein said processing means processes prior received data and operator input signals and selects said vector weight coefficients in response thereto.

5. The antenna system as defined in claim 4 further comprising:

receiver means coupled between said multiplier means and said processing means for receiving each of said N weighted signals and converting said N weighted signals to a data signal.

6. The antenna system as defined in claim 4 further comprising:

input means for receiving input control signals; and output means for providing output data received by said antenna system.

7. The antenna system as defined in claim 2 wherein said beam pattern includes increased gain steered in a desired direction.

8. The antenna system as defined in claim 2 wherein said beam pattern includes a null adaptively formed to reduce the gain in a desired direction.

9. The antenna system as defined in claim 2 wherein said beam pattern includes combinations of increased gains and nulls to adaptively form a desired beam pattern.

10. The antenna system as defined in claim 2 wherein said antenna system further comprises means for determining the vector direction of a signal received by said antenna system.

11. The antenna system as defined in claim 9 wherein said antenna system may adapt the beam pattern to changing conditions.

12. The antenna system as defined in claim 1 further comprising:

a plurality of beam forming algorithms, wherein said processing means selects and processes one of said algorithms to generate said set of N vector weight coefficients.

13. A multifunction antenna system for transmitting and receiving radiating signals in selected beam patterns, said antenna system comprising:

antenna beamforming means having an array of N elements for transmitting and receiving signals, said antenna beamforming means further having N analytic voltage signals associated with said N elements;

weight source means for providing a plurality of combination of N vector weight coefficients which represent predetermined beam patterns;

processing means for selecting a set of N vector weight coefficients which are representative of a desired beam pattern; and weighting means for multiplying said N vector weight coefficients by an input transmit signal to produce said N analytic voltage signals when transmitting signals within a selected beam pattern, said weighting means multiplying said N vector weight coefficients by said N analytic signals received so as to enable processing of data received from a selected beam pattern when receiving.

14. The antenna system as defined in claim 13 wherein said antenna beamforming means comprises a multiple arm spiral antenna having an array of N symmetric spiral elements.

15. The antenna system as defined in claim 13 wherein said processing means processes prior received data and operator input signals and selects said vector weight coefficients in response thereto.

16. A multifunction antenna system comprising:

a multiple arm spiral antenna having an array of N elements associated therewith for transmitting and receiving radiating signals, said multiple arm spiral antenna further having N analytic signals associated with the N elements;

memory means for providing a plurality of combinations of N vector weight coefficients which represent predetermined beam patterns;

processing means for selecting a set of N vector weight coefficients from said memory means which are representative of a predetermined beam pattern; and weighting means for multiplying the N vector weight coefficients by an input transmit signal to produce said N analytic voltage signals when transmitting signals within a selected beam pattern, said weighting means multiplying the N vector weight coefficients by said N analytic signals to provide N weighted receive signals when receiving signals which enables processing of data received from a selected beam pattern.

* * * * *